Patented Feb. 16, 1943

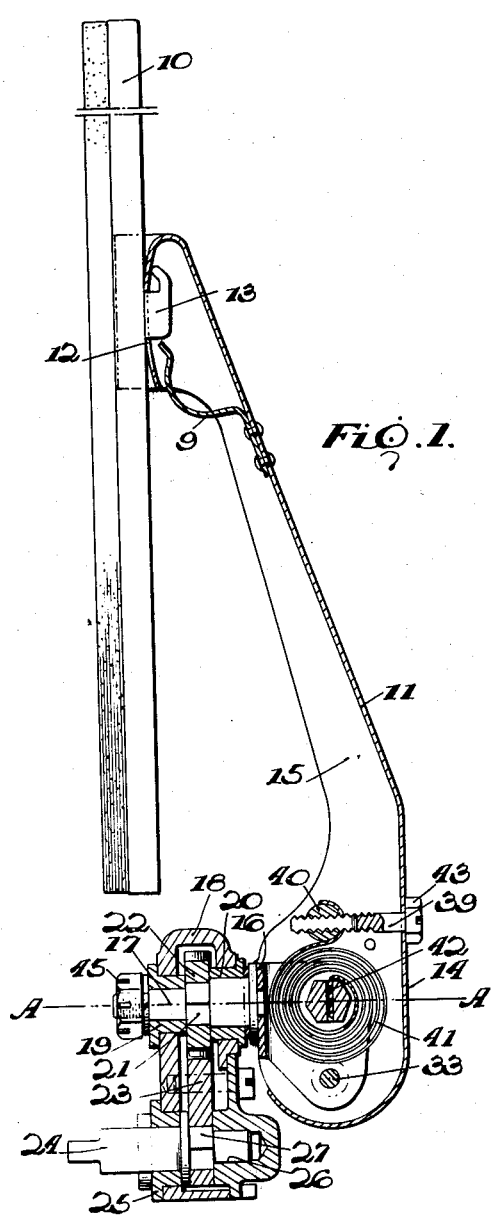
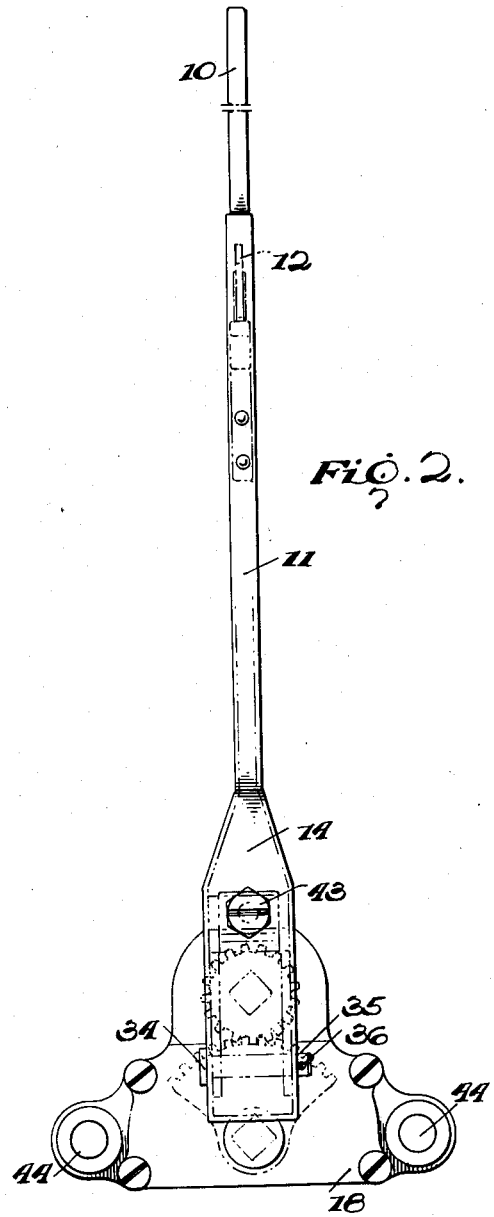
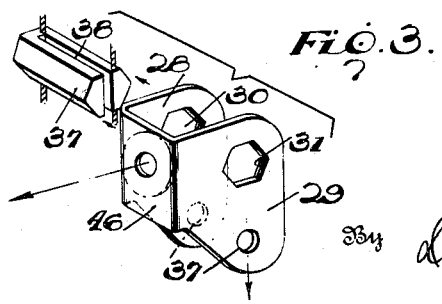

2,311,121

UNITED STATES PATENT OFFICE 2,311,121

WINDSHIELD WIPER DRIVE

Henry C. Nette, Rutherford, and Myron L. Taylor, West Englewood, N. J., assignors to Bendix Aviation Corporation, South Bend, Ind., a corporation of Delaware Application October 9, 1941, Serial No. 414,366

6 Claims. (Cl. 15—255)

This invention relates to motor actuated mechanisms, and in particular, to windshield wiper drives.

It is an object of the present invention to provide a windshield wiper drive of the oscillatory type, wherein the moment of inertia of the assembly is minimized.

It is another object of the invention to provide a windshield wiper drive wherein the blade may be urged into operative position with a powerful resilient member which rotates or oscillates about its center of gravity.

Other objects will appear from a study of the following specification when made in conjunction with the attached drawing, throughout which like numerals designate like parts.

Fig. 1 is a cross-sectional view of a windshield wiper drive formed in accordance with the present invention.

Fig. 2 is an elevational view of the windshield wiper drive shown in Fig. 1; and Fig. 3 is a detail of certain portions shown in cross-section in Fig. 1.

There are many types of windshield wiper blade and arm combinations adapted to be driven by an oscillatory motor, but all of these devices are of such construction as to render them incapable of the high speed operation and high pressure of the blade against the windshield that is required for operation of windshield wipers on aircraft.

It is a requirement of windshield wipers for aircraft that they operate at one or two hundred cycles for minute, and at windshield pressures greatly in excess of those normally used on automobiles, so that rain water, snow and incipient ice formations may be successfully kept from the path of the wiper.

In accordance with the present invention, a windshield wiper arm of sturdy construction carries a blade member of conventional form, and is driven through a motor of any desired type through a drive mechanism including gears, a strong coiled spring for urging the wiper blade against the windshield and a novel pivotal arrangement whereby the blade arm assembly, including the coiled spring, may be rotated substantially about the center of gravity of the coiled spring.

As shown in the drawing, 10 represents a windshield wiper blade carried on the outer extremity of a blade arm 11 by means of a connection comprising a slot 12 and an interfitting hook member 13. A leaf spring 9 is riveted to blade arm 11, and extends in the neighborhood of hook member 13 to keep blade 10 assembled to arm 11 during periods of ordinary use, and yet to afford a means of ready withdrawal of blade 10 for replacement purposes. Arm 11 has a transverse wall member 14 and depending parallel wall members 15 carried thereby. A bracket or yoke member 16, shown in detail in Fig. 3, is rigidly attached, as by a welded connection, to a shaft member 17, which is carried in housing member 18 by means of suitable bearings 19 and 20 extending through apertures in the housing. Shaft 17 has a square or other angularly shaped section 21, upon which is carried a pinion 22 that meshes with an arcuate or segmental gear 23 carried upon a stub shaft 24, which is supported by bearings 25 and 26, carried by housing 18. Segmental gear 23 is connected by means of a square or other angular portion 27 of shaft 24, so that stub shaft 24, upon oscillation by a motor (not shown), may rotate gear 23.

Bracket member 16, the transverse portion of which is fixed to shaft 17, carries parallel and right angularly extending wall members 28 and 29, which latter have hexagonal and aligned apertures 30 and 31, and other aligned apertures 32, through which a suitable pin or rivet member 33 is passed, extending through wall portions 15 of blade arm 11 and terminating in a head member 34 and a shank member 35, which may carry a cotter pin or other fastening device (not shown) in a bore 36. The hexagonal holes 30 and 31 are meant to receive a transversely extending hexagonal bar 37, having a slot 38 extending almost completely for the length of bar 37. A screw 39, which threads into a cylindrical bar member 40 and is carried by wall 14 of blade arm 11, carries the outer extremity of a coiled or spiral spring 41, having its inner end 42 inserted within slot 38.

Screw member 39 terminates in an enlarged head member 43 exteriorly of wall 14 of blade 11.

Stub shaft 24 may be rotated by any conventional oscillatory motor, for example, that shown and described in the Nette and Taylor application, Serial No. 396,918, filed on June 6, 1941. The assembly shown is intended for mounting outside the aircraft cabin, so that blade 10 may bear against the cabin windshield. Housing 18 is maintained fixed to the skin of the aircraft by means of bolting members (not shown) which extend through the mounting base containing bores 44.

Shaft 17 is secured within housing 18 by means of a locking nut 45, and upon the oscillation of stub shaft 24 by a suitable motor, shaft 17 will be oscillated, carrying bracket member 16 and blade arm 11 through any predetermined arc of movement for freeing the windshield of rain or snow.

Coiled spring 41 preferably has a high spring value, so that blade arm 11 may urge blade 10 against the windshield with considerable pressure. The amount of pressure of contact between the blade 10 and the windshield may be finely adjusted by advancing or retracting screw 39 within screw-threaded member 40 until suitable pressure of wiper blade 10 is obtained, whether the blade be upon a planar or curved windshield. A coarse adjustment of spring tension, so that one particular spring may be used in a variety of installations, may be obtained, prior to final assembly of the wiper blade unit, by rotating the outer end of the spring carried by anchor member 40 about the axis of coiled spring 41, either clockwise as shown in Fig. 1, to increase the blade-to-windshield pressure, or counter-clockwise, to decrease the blade-to-windshield pressure. It will be noticed that the axis of the coiled spring 41 lies substantially in the same plane as the axis A—A of shaft 17, which, of course, is the axis of rotation of the blade arm assembly.

The use of a coiled spring, as shown in the present invention, reduces the moment of inertia of the necessary pressure member to a minimum, since the spring has small radial extent and is rotated about an axis lying in the plane of, and at right angles to the axis of the spring. This feature is quite important since in the prior art devices, the leaf springs commonly used for urging the wiper blade against a windshield extend quite a distance away from the center of rotation, and therefore, for the same spring value and approximately the same weight as the coiled spring shown, the moment of inertia of the leaf spring will be much greater. The value of a low moment of inertia is appreciated particularly at the high speeds found to be necessary in aircraft windshield wiper installations.

Many changes may be made to the present invention without departing from the scope of the invention. It is intended, therefore, not to restrict the invention to the particular showing taken as an example thereof, but solely by the scope of the appended claims.

What is claimed is:

1. A windshield wiper drive of the oscillatory type comprising a first shaft having means for connecting it to a source of power, a second shaft geared to said first shaft, a yoke member carried on said second shaft, a slotted bar member extending athwart said yoke member, a spiral spring having its inner end carried by said slotted bar, a wiper arm, a connection between the outer end of said spring and said wiper arm, and a pivotal connection between an extremity of said yoke and an extremity of said wiper arm.

2. A windshield wiper drive comprising a motor-driven shaft, a second shaft, gearing therebetween, a yoke member including a transverse portion fixed to said second shaft, parallel plate members integral with said transverse portion, non-circular and aligned apertures formed in said plate members, a rigid member fitted into said non-circular apertures, a wiper blade arm pivoted to said yoke at a point spaced from said rigid member, an anchor member fixed to said wiper blade arm at a point spaced from said rigid member, and a coiled spring member having its inner end carried by said rigid member and its outer end by said anchor member for resiliently urging said blade arm in one direction with respect to said yoke about said pivot point.

3. A windshield wiper drive of the oscillatory type comprising a motor-driven shaft, a second shaft geared thereto, a bracket member having a transverse wall fixed to said second shaft and two parallel walls extending rectangularly of said transverse wall, non-circular and aligned apertures formed in said parallel walls, anchoring means carried between said apertures, a blade arm having a transverse wall parallel to the transverse wall of said bracket and parallel wall members overlying the parallel walls of said bracket, a pivotal connection between the parallel walls of said bracket and of said arm, said connection being spaced from said anchoring means, and resilient means co-acting between said anchoring means and said blade arm for urging said arm into operative position.

4. A windshield wiper drive of the oscillatory type comprising a motor-driven shaft, a second shaft driven thereby, a bracket member having a transverse wall fixed to said second shaft, and two parallel walls extending rectangularly of said transverse wall, a bar, means on said parallel walls for carrying said bar, a blade arm having a transverse portion and parallel walls overlying the parallel walls of said bracket, a pivotal connection between said bracket and the walls of said blade arm, said connection being spaced from said bar, and resilient means co-acting between said bar and said blade arm for urging said arm into operative position.

5. A windshield wiper drive of the oscillatory type, comprising a motor-oscillated shaft, a bracket fixed thereto, a wiper blade arm having a pivotal connection with said bracket, and a coiled spring having its inner end anchored to said bracket and its outer end anchored to said wiper arm, the axis of said coiled spring extending transversely of the axis of rotation of said shaft, said pivotal connection having an axis parallel to the axis of said coiled spring and spaced therefrom, and lying outside the convolutions of said coiled spring.

6. A windshield wiper drive of the oscillatory type comprising a motor-oscillated shaft, a bracket fixed thereto, a wiper blade arm, a coiled spring having its inner end anchored to said bracket and its outer end anchored to said blade arm, the axis of said coiled spring being in substantially the same plane as the axis of said shaft, and a pivotal connection between said bracket and said wiper arm at a point spaced from said coiled spring and outside the convolutions of said coiled spring.

HENRY C. NETTE.
MYRON L. TAYLOR.